(12) United States Patent
Mori

(10) Patent No.: US 6,442,058 B2
(45) Date of Patent: Aug. 27, 2002

(54) CONTROL CIRCUIT AND SEMICONDUCTOR DEVICE INCLUDING SAME

(75) Inventor: Yasumichi Mori, Ikoma (JP)

(73) Assignee: Sharp Kabushiki Kaisha (JP)

( * ) Notice: Subject to any disclaimer, the term of this patent is extended or adjusted under 35 U.S.C. 154(b) by 0 days.

(21) Appl. No.: 09/834,963

(22) Filed: Apr. 13, 2001

(30) Foreign Application Priority Data

Apr. 21, 2000 (JP) ........................................ 2000-121845

(51) Int. Cl.$^7$ .............................................. G11C 17/00
(52) U.S. Cl. .............. 365/103; 365/185.23; 365/230.06; 365/230.08
(58) Field of Search ............................ 365/103, 230.06, 365/185.23, 230.08, 191, 233.5

(56) References Cited

U.S. PATENT DOCUMENTS 5,896,325 A * 4/1999 Fujioka .................. 365/189.07
6,181,629 B1 * 1/2001 Ogura ......................... 365/104
6,182,004 B1 * 1/2001 Komori .................. 365/185.04

* cited by examiner

Primary Examiner—Vu A. Le
Assistant Examiner—VanThu Nguyen
(74) Attorney, Agent, or Firm—Morrison & Foerster LLP

(57) ABSTRACT

A control circuit comprises an external command recognition section for recognizing an external command, the external command being an operation command input from outside the control circuit, an internal ROM bank including a plurality of storage regions, the internal ROM bank being used to store an internal code for achieving operations specified by the external command recognized by the external command recognition section, an internal ROM selection section for selecting a required storage region from the plurality of storage regions of the internal ROM bank in accordance with the external command recognized by the external command recognition section, a program counter for selecting and indicating an address of an internal command to be executed from a plurality of addresses of internal commands stored in the internal ROM bank, an internal command register for storing the internal command read from the internal ROM bank, and an internal command execution section for executing the internal command stored in the internal command register.

6 Claims, 11 Drawing Sheets

| External command | Operation code | Leading address of internal code | Signal 1H recognizing external command |
|---|---|---|---|
| Invalid | 00 | Invalid (0000H) | None |
| α | 01 | 0001H | External command α EN |
| β | 10 | 0002H | External command β EN |
| γ | 11 | 0003H | External command γ EN |

CONTROL CIRCUIT AND SEMICONDUCTOR DEVICE INCLUDING SAME

BACKGROUND OF THE INVENTION

1. Field of the Invention

The present invention relates to a control circuit used in a microcomputer, a semiconductor memory, or the like as a command processor, and a semiconductor device including the same. More particularly, the present invention relates to a control circuit having an internal code interpretation section, which is used in a non-volatile semiconductor memory requiring a complicated internal control, and a semiconductor device including the same.

2. Description of the Related Art

Recent advances of semiconductor technology and increasing variety of its applications lead to further complication and diversification of the specification of a microcomputer, a semiconductor memory, and the like. The development of a high-performance, highly-reliable device in a short time is a challenge. To address such a challenge, a circuit block in an existing device is preferably reused so as to reduce the development time. Particularly, since a typical control circuit is a collection of complicated circuits, the reuse of an existing circuit significantly contributes to a reduction in the development time.

A control circuit having an internal code interpretation section may be used for a non-volatile semiconductor memory or the like requiring complicated internal control. An internal command which can be executed directly by a control circuit is herein referred to as an "internal command". A command, which externally instructs a semiconductor memory or the like to operate, is referred to as an "external command". Typically, an operation specified by an external command is achieved by a number of internal commands which are executed in a specified sequence. Such a group of internal commands which are arranged in a specified order (a program composed of internal commands so as to achieve an operation specified by an internal command) is herein referred to as an "internal code".

A semiconductor memory will be described as an example. An external instruction to a semiconductor memory, such as data write and data erase, corresponds to an external command. A series of internal commands included in a semiconductor memory, which are sequentially executed so as to achieve data write or data erase, corresponds to an internal code. In particular, the area of a semiconductor memory or the like should be as small as possible. Therefore, a control circuit including internal commands having a fixed instruction length, which leads to simplification of the circuit, is used.

FIG. 11 is a diagram showing a structure of a conventional control circuit 210. The control circuit 210 includes an external command register 26, a control signal register 27, and an internal code interpretation section 29. An external command 2B input from the outside of the control circuit 210 is stored in the external command register 26. The control signal register 27 receives a signal 2I output from the internal code interpretation section 29, and outputs a control signal 2A to the outside of the control circuit 210. The internal code interpretation section 29 includes an internal code storage section 21, an internal command register 22, a program counter 23, an internal command execution section 24, and an external command recognition section 25. The internal code storage section 21 (hereinafter referred to as an "internal ROM") includes a ROM or the like in which an internal code is stored. The internal ROM 21 may include a non-volatile memory. The internal command register 22 is used to store an internal command 2E read from the internal ROM 21, and outputs an internal command 2F. The program counter 23 selects and provides the address of an internal command to be executed, from the addresses of a plurality of internal commands stored in the internal ROM 21. The internal command execution 24 executes the internal command 2F output from the internal command register 22. The external command recognition section 25 recognizes an operation instructed by an external command.

FIG. 12 is a diagram showing a structure of a semiconductor memory 220 including the control circuit 210. The semiconductor memory 220 includes an input/output buffer 201, an input buffer 202, an internal booster circuit 203, a write/erase control circuit 204, and address decoder circuit 205, a memory array 206, a sense circuit 207, and a control circuit 210. The input/output buffer 201 has data buses D0 through Dn at the input and output sides. The data buses D0 through Dn are used to input external commands, write data, and the like, and to output read data. The input buffer 202 has address buses A0 through An at the input side. The input buffer 202 receives a chip selection signal CE# (# represents an inverted signal) and a command write enable signal WE#. The internal booster circuit 203 boosts a supply voltage Vpp. The memory array 206 is used to store information. The sense circuit 207 reads out information from the memory array 206.

In the semiconductor memory 220, the circuits 203, 204 and 207 are controlled in accordance with the control signal 2A output from the control circuit 210 so that information is written to or erased from the memory array 206. The control signal 2A is input to the internal booster circuit 203, the write/erase control circuit 204 and the sense circuit 207. For example, the internal booster circuit 203 is controlled so that the start or end of a boost is controlled in accordance with the control signal 2A, or the boosted potential of the supply voltage Vpp is determined.

An operation of the control circuit 210 will be described.

The external command 2B stored in the external command register 26 is output from the external command register 26 to the external command recognition section 25. The external command recognition section 25 recognizes whether the external command 2B can be executed by the control circuit 210. When it is determined that the external command 2B can be executed by the control circuit 210, the external command recognition section 25 outputs a leading address 2C of an internal code required for an operation specified by the external command 2B. The program counter 23 selects and provides the address of an internal command to be executed, from a plurality of internal command addresses stored in the internal ROM 21. The internal ROM 21 outputs an internal command corresponding to a leading address 2D of the internal code stored in the program counter 23 (in this case, the address 2D is identical to the address 2C), i.e., a leading internal command 2E in the internal code to be executed, to the internal command register 22 in which the internal command is in turn stored. The internal command execution section 24 executes a specified operation, control, or the like in accordance with an internal command 2F output from the internal command register 22. The internal command execution section 24 outputs a signal 2I to update a value stored in the control signal register 27 if required, or outputs an address 2G of an internal command to be executed to the program counter 23 in order to store an internal code 2E to be executed in the internal command register 22.

As described above, the control circuit 210 achieves an operation specified by the external command 2B by a plurality of internal commands stored in the internal ROM 21 being output to the internal command execution section 24 in a specified sequence, and being executed sequentially.

In the control circuit 210, the implementation of a new external code, the change of an existing external code, and the like can be achieved by changing an internal code stored in the internal ROM 21. Therefore, the control circuit 210 is used for general purposes.

When a semiconductor memory having a new operating specification is developed, the configuration of the control circuit of the semiconductor memory is used, as it is, by changing an internal code. Now it is assumed that an attempt is made to develop a new semiconductor memory adopting a write architecture different from a conventional one. Although peripheral circuits, such as the address decoder circuit 205 and the write/erase control circuit 204, need to be newly developed, a control circuit for controlling the peripheral circuit can be used only by changing the internal code so that the peripheral circuit is operated in a desired manner, without modification of the basic structure.

As described above, the control circuit 210 can be used for general purposes by changing the internal code stored in the internal ROM 21. The control circuit 210 contributes to reutilization of design resources, thereby reducing the development time of a device having a high level of performance and reliability.

A longer internal command sequence (a greater capacity of internal code) than a conventional one needs to be stored in the internal ROM 21 using a semiconductor memory or the like including the control circuit 210, in order to: (1) achieve various types of specification; (2) implement an external command requiring a complicated internal operation; or (3) correspond an internal code to a number of external commands.

Examples of factors which restrict the capacity of an internal ROM include the number of bits in a program counter, the instruction length (bit length) of an internal command, and the number of bits of an internal command register.

Hereinafter, the number of bits in a program counter will be described.

To select one internal command from an internal ROM and output the internal command to an internal command register, the program counter needs to indicate one address in an address space in the internal ROM as described above. For example, when the program counter has a 16-bit structure, the address space (the addresses of the internal ROM) which the counter can point to is in the range of 0000H to FFFFH. Even if the internal ROM has an address space which exceeds such a range, an internal command at an address outside the range cannot be read out. In this case, the available capacity of the internal ROM is limited to $2^{16}$ words (64 K words: 65536 lines of internal commands).

Next, the instruction length (bit length) of an internal command will be described.

When an architecture having a fixed instruction length is adopted, an internal command has a predetermined number of bits (instruction length). An internal command having a width of N bits is herein referred to as an N-bit instruction. Any type of an internal command includes an operation code of several bits indicating the type of an operation (calculation, control, or the like) in the execution part of the internal command. Further, a typical internal command includes an instruction which directly specifies an address in the internal ROM of a command to be executed (the instruction is generally referred to as a jump instruction or a call instruction). This command is essential in a conditional branch in an algorithm achieved by an internal code. For example, a jump instruction includes at least the above-described operation code portion, and the address in the internal ROM of an internal command to be executed. In this case, when the control circuit 210 adopting a 16-bit instruction is used, if the operation code portion is one bit, the address space is a space indicated only by 15-bit addresses. Therefore, when a target range of branches of a jump instruction is all internal commands within an internal code, the available capacity of the internal ROM is $2^{13}$ words (32 k words: 32768 lines of internal commands).

The number of bits in an internal command register will be described.

A control circuit adopting an N-bit instruction needs to include an internal command register having at least a capacity of N bits. Therefore, the number of bits in the internal command register restricts the instruction length of an internal command, and further restricts the capacity of an internal available ROM.

As described above, when the control circuit 210 is used, the capacity of the internal ROM is restricted depending on the circuit configuration thereof. To remove the restriction, the number of bits in a program counter, the instruction length (bit length) of an internal command, and the number of bits in the internal command register may be increased to a required level.

For example, if the instruction length of each internal command is longer but the lines of internal commands are the same, the physical capacity of an internal ROM required for storage of the internal commands is increased. For example, when an internal code having 1024 lines (1 Kwords) of internal commands are stored in an internal ROM, a control circuit adopting a 12-bit instruction requires an internal ROM having a capacity of 12 Kbits. Similarly, a control circuit adopting a 16-bit instruction requires an internal ROM having a capacity of 16 Kbits. An increase in the physical capacity of an internal ROM means an increase in the area of a chip. Further, an internal command execution portion and an internal command register need to be modified, the width of a signal bit line or the like between each component circuit needs to be increased depending on the instruction length of an internal command, and the like. Thus, an increase in the physical capacity of an internal ROM leads to a considerable level of modification of hardware and an increase in the area of a chip. Moreover, when the instruction length of an internal command is increased, the development environment of software, such as a translating program (e.g., assembler), may be changed. The instruction length of an internal command also needs to be increased when the number of bits in a program counter is increased or when the number of bits in an internal command register is increased.

As described above, when the control circuit 210 is used, the removal of restrictions on the capacity of an internal ROM leads to a considerable level of modification of the control circuit which causes an increase in the development time of a device or an increase in the area of a chip. Further, a conventional development environment or a past design resource may be sacrificed. In other words, when the control circuit 210 is reused to reduce the development time of a device, the restriction on the capacity of an internal ROM cannot be removed.

SUMMARY OF THE INVENTION

According to one aspect of the present invention, a control circuit comprises an external command recognition section for recognizing an external command, the external command being an operation command input from outside the control circuit, an internal ROM bank including a plurality of storage regions (e.g., ROM regions), the internal ROM bank being used to store an internal code for achieving operations specified by the external command recognized by the external command recognition section, an internal ROM selection section for selecting a required storage region from the plurality of storage regions of the internal ROM bank in accordance with the external command recognized by the external command recognition section, a program counter for selecting and indicating an address of an internal command to be executed from a plurality of addresses of internal commands stored in the internal ROM bank, an internal command register for storing the internal command read from the internal ROM bank, and an internal command execution section for executing the internal command stored in the internal command register.

In one embodiment of this invention, the internal ROM selection section can switch the selected storage region depending on a result of a comparison of the address indicated by the program counter with a specific address.

In one embodiment of this invention, the internal ROM selection section further includes an address register, and the specific address can be changed by setting an arbitrary value in the address register.

According to another aspect of the present invention, a semiconductor device comprises a control circuit. The control circuit comprises an external command recognition section for recognizing an external command, the external command being an operation command input from outside the control circuit, an internal ROM bank including a plurality of storage regions, the internal ROM bank being used to store an internal code for achieving operations specified by the external command recognized by the external command recognition section, an internal ROM selection section for selecting a required storage region from the plurality of storage regions of the internal ROM bank in accordance with the external command recognized by the external command recognition section, a program counter for selecting and indicating an address of an internal command to be executed from a plurality of addresses of internal commands stored in the internal ROM bank, an internal command register for storing the internal command read from the internal ROM bank, and an internal command execution section for executing the internal command stored in the internal command register.

In one embodiment of this invention, the internal ROM selection section can switch the selected storage region depending on a result of a comparison of the address indicated by the program counter with a specific address.

In one embodiment of this invention, the internal ROM selection section further includes an address register, and the specific address can be changed by setting an arbitrary value in the address register.

Hereinafter, functions of the present invention will be described.

As described above, according to the present invention, a storage region in which an internal code required for achievement of an operation specified by an external command is stored, can be selected from an internal ROM bank including a plurality of storage regions. Therefore, the capacity of an internal ROM can be increased without an increase in the number of bits in a program counter, the instruction length (bit length) of an internal command, and/or the number of bits in an internal command register, unlike conventional control circuits. Conventionally, the capacity of an internal ROM is restricted by the number of bits in a program counter, the instruction length (bit length) of an internal command, and/or the number of bits in an internal command register, so that if there is an address space of the internal ROM which exceeds the restricted capacity, an internal command at an address falling within the exceeding portion cannot be read out. In the present invention, the internal ROM bank is divided into a plurality of regions so that, the address space of each selected region of the internal ROM can be utilized in a range corresponding to the same capacity as that of a conventional internal ROM. The plurality of storage regions may not necessarily be of the same size. The capacity of each storage region may be set to a minimum value. Further, an internal ROM selection section, a comparator circuit, an address register, and the like having a simple structure can be achieved, so that a configuration of the control circuit is not complicated. Each of the plurality of regions in the internal ROM is herein referred to as an internal ROM bank.

Further, according to the present invention, a comparator circuit or the like is provided in an internal ROM selection section so that the address of an internal command to be executed, indicated by a program counter, is compared with a specific address. In accordance with a result of the comparison, a storage region is selected so that an internal command can be shared by a plurality of internal codes. Therefore, a storage region can be physically reduced.

Furthermore, according to the present invention, an address register is provided in an internal ROM selection section and the address register is set to an arbitrary value. The address of an internal command to be executed is compared with the value of the address register. In accordance with the result of the comparison, a storage region is selected so that the internal command shared by a plurality of internal codes can be provided in an arbitrary storage region.

With the control circuit of the present invention, field-proven design resources are utilized so as to reduce the development time of a semiconductor device, such as a microcomputer and a memory.

Thus, the invention described herein makes possible the advantages of providing: a control circuit in which the capacity of an internal ROM can be increased without a considerable level of modification of the control circuit and an increase in the area of a chip, and the development time of an application device can be reduced by utilizing existing design resources; and a semiconductor device including the control circuit.

These and other advantages of the present invention will become apparent to those skilled in the art upon reading and understanding the following detailed description with reference to the accompanying features.

DESCRIPTION OF THE PREFERRED EMBODIMENTS

Hereinafter, the present invention will be described by way of illustrative examples with references to the accompanying drawings.

EXAMPLE 1

Figure 1:
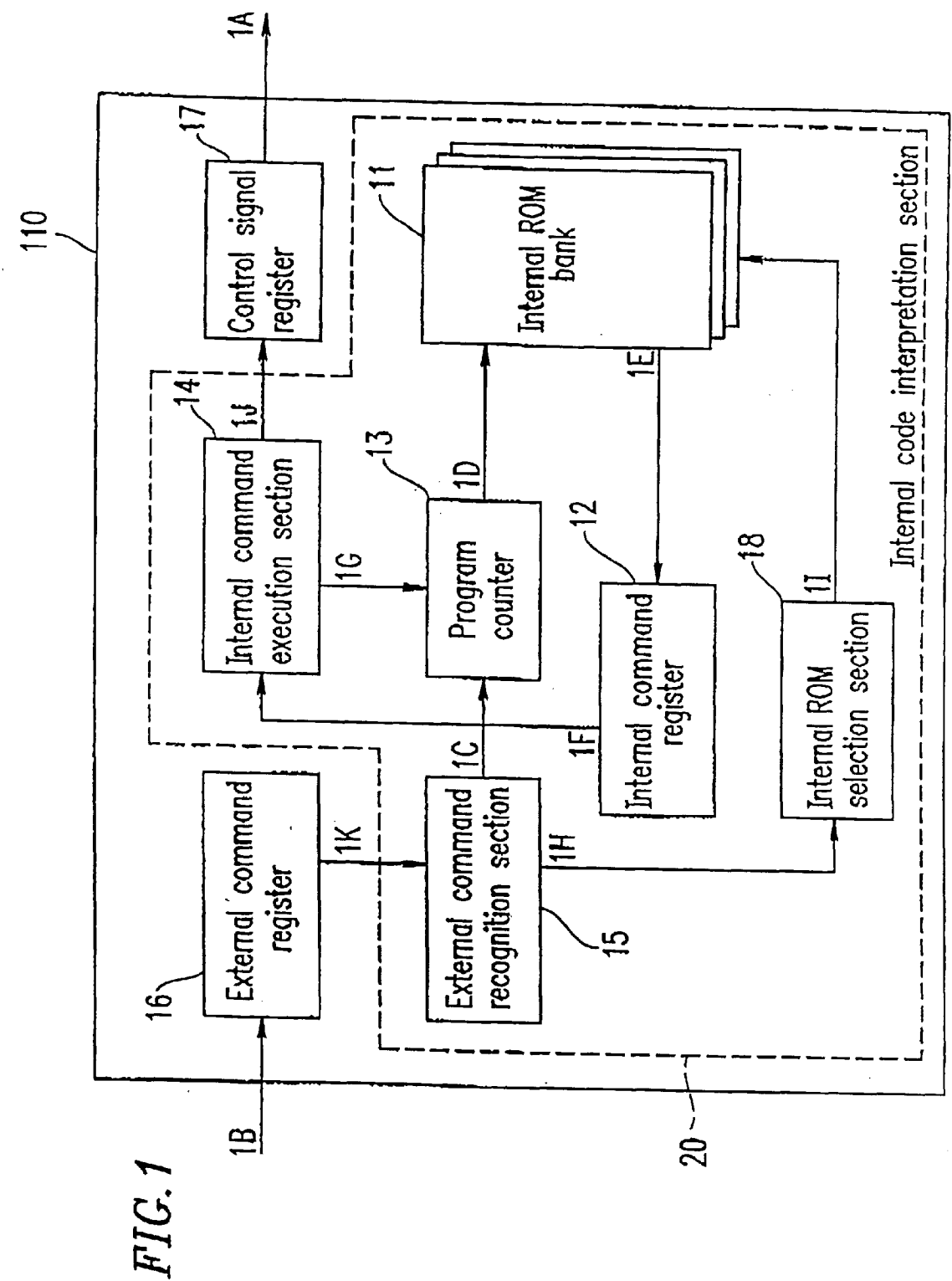
FIG. 1 is a diagram showing a structure of a control circuit 110 according to Example 1 of the present invention.

FIG. 1 is a diagram showing a structure of a control circuit 110 according to Example 1 of the present invention.

The control circuit 110 includes an external command register 16, a control signal register 17, and an internal code interpretation section 20. The external command register 16 is used to store an external command 1B input from the outside of the control circuit 110. The control signal register 17 outputs a control signal 1A to the outside of the control circuit 110.

The internal code interpretation section 20 includes an internal ROM bank 11, an internal command register 12, a program counter 13, an internal command execution section 14, an external command recognition section 15, and an internal ROM selection section 18. The internal code storage section 11 (hereinafter referred to as an "internal ROM bank") includes a ROM in which an internal code is stored, and the like, and is divided into a plurality of regions. The internal command register 12 is used to store an internal command 1E read from the internal ROM bank 11. The program counter 13 indicates the address of an internal command to be executed of an internal code stored in the internal ROM bank 11. The internal command execution section 14 executes an internal command 1F stored in the internal command register 12. The external command recognition section 15 recognizes an operation instructed by an external command. The internal ROM selection section 18 selects a required ROM region from the plurality of ROM regions included in the internal ROM bank 11 in accordance with the external command recognized by the external command recognition section 15.

The internal ROM selection section 18 receives a signal 1H for identifying the external command recognized by the external command recognition section 15, and outputs an internal ROM switching signal 1I to the internal ROM bank 11. In accordance with the internal ROM switching signal 1I, a ROM region in which an internal code required for achievement of an operation specified by the external command 1B is stored, is selected from the plurality of ROM regions included in the internal ROM bank 11.

Note that the external command 1B has the same structure as that of the conventional external command 2B. The external command register 16 and the program counter 13 each have the same structure as that of the conventional external command register 26 and the program counter 23, respectively.

Next, an operation of the control circuit 11 will be described. The control circuit 110 is assumed to implement a plurality of external commands α, β and γ. Note that in the following description, internal codes required for achievement of the commands α, β and γ are referred to as internal codes α, β and γ, respectively. The internal codes α and β are stored in ROM region o in the internal ROM bank 11 and the internal code γ is stored in ROM region 1 in the internal ROM bank 11. One of the internal codes α, β and γ may be included partially or totally in the other internal code. The internal codes α, β and γ may include the same command. Further, the number of external commands to be implemented is not restricted. The number of internal codes included in the same ROM region is not restricted. The capacities (sizes) of the ROM regions may be different from each other.

The external command register 16 included in the control circuit 110 receives the external command 1B. The external command 1B stored in the external command register 16 is output from the external command register 16 to the external command recognition section 15. The external command recognition section 15 determines whether the external command 1B is a command which can be executed in the control circuit 110. Specifically, the external command recognition section 15 determines whether the external command 1B is an external command implemented in the control circuit 110, based on the operation code portion of the external command 1B or the external command 1B itself.

Figures 2A, 2B:
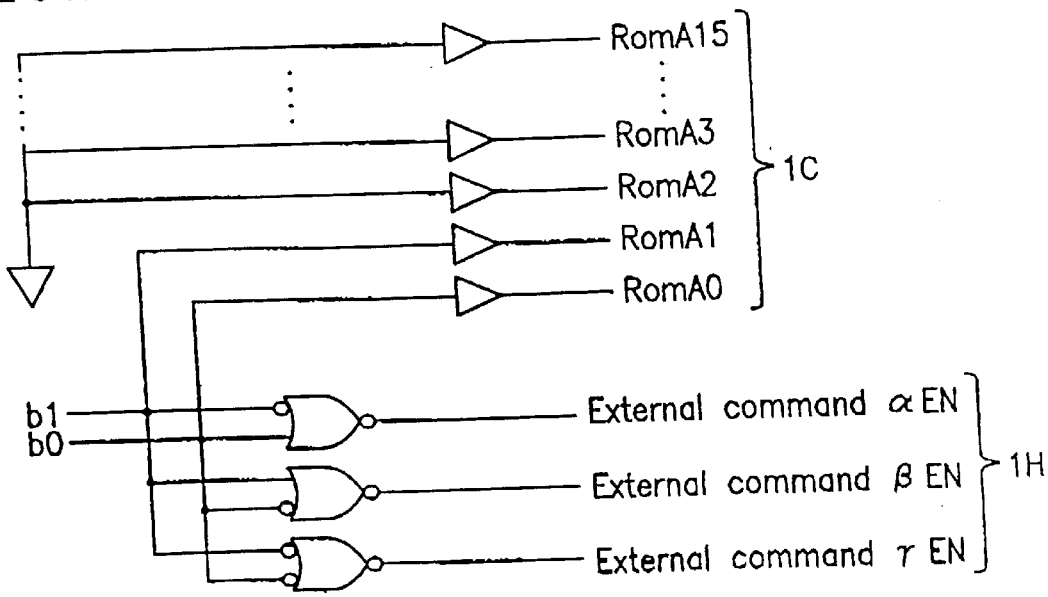
FIGS. 2A and 2B are diagrams used for explaining an operation of an external command recognition section 15 in the control circuit 110 of Example 1.

FIGS. 2A and 2B are diagrams used for explaining an operation of the external command recognition section 15 in the control circuit 110 of Example 1. Implemented external commands are indicated as α, β and γ, and each command includes a 2-bit operation code (b0, b1) as shown in FIG. 2A. For example, the external command α includes an operation code (0, 1). The external command β includes an operation code (1, 0). The external command γ includes an operation code (1, 1). When the external command 1B corresponds to one of the three external commands (α, β or γ), the external command recognition section 15, having a circuit configuration shown in FIG. 2B, causes an external command EN signal (αEN, βEN and γEN) corresponding to an external command to be "H" (corresponding to the signal 1H for recognizing an external command in FIG. 1). The leading address (16 bits in this case) of an internal code corresponding to each external command includes RomA0 through RomA15 (corresponding to a signal 1D) which are output to the program counter 13.

When the external command 1B is determined to be a valid command, the external command recognition section 15 output the signal 1H for identifying the recognized external command to the internal ROM selection section 18. The internal ROM selection section 18 selects a ROM region in which an internal code required for achievement of an operation specified by the external command 1B is stored, from the plurality of ROM regions included in the internal ROM bank 11.

The external command recognition section 15 outputs a leading address 1C of the internal code required for achievement of an operation specified by the external command 1B to the program counter 13. The program counter 13 selects and provides the address of an internal command to be executed from the addresses of the plurality of command stored in the internal ROM bank 11. In this case, an internal command specified by the leading address 1C is stored in a ROM region selected by the internal ROM selection section 18 (e.g., ROM region 0 described later).

In the selected ROM region (e.g., ROM region 0 described later) in the internal ROM bank 11, an internal command (the leading command 1E of an internal code to be executed) corresponding to the leading address 1D (identical to 1C in this case) of an internal codes stored in the program counter 13 is output to the internal command register 12 in which the internal command is in turn stored.

Figure 3:
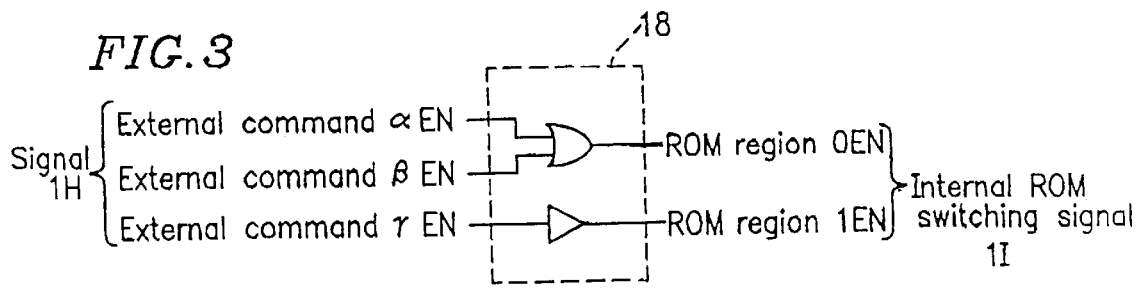
FIG. 3 is a diagram showing a structure of an internal ROM selection section 18 in the control circuit 110 of Example 1.

FIG. 3 is a diagram showing a structure of the internal ROM selection section 18 in the control circuit 110 of Example 1.

The internal ROM selection section 18 causes only the external command αEN signal included in the signal 1H for identifying an external command to be "H". The external command αEN signal is generated by decoding an operation code (bit sequence) included in the external command α by the external recognition section 15. The external command αEN signal indicates that the input external command is the external command α. Thereafter, the internal ROM selection section 18 outputs the internal ROM switching signal 1I in which only the ROM region 0EN signal for selecting the ROM region 0 is "H".

Figure 4:
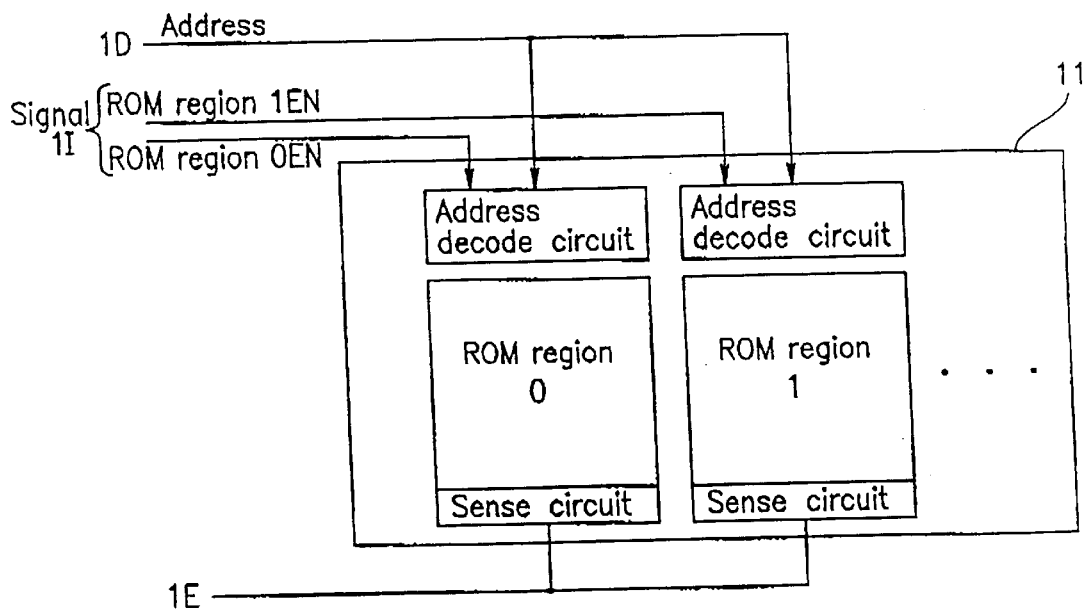
FIG. 4 is a diagram showing a structure of an internal ROM bank 11 in the control circuit 110 of Example 1.

FIG. 4 is a diagram showing a structure of the internal ROM bank 11 in the control circuit 110 of Example 1.

When the ROM region 0EN signal is caused to be "H" the internal ROM bank 11 activates an address decoder circuit at the ROM region 0 side. Thereafter, the internal ROM bank 11 outputs the internal command 1E (stored in the selected ROM region), which corresponds to the address 1D provided by the program counter 13, to the internal command register 12. For example, the leading internal command of the internal code α stored in the selected ROM region 0 is output to the internal command register 12.

The internal command execution section 14 includes a register file, a variety of operation sections, and the like, and performs a specified operation, control, or the like in accordance with the internal command 1F stored in the internal command register 12. The internal command execution section 14, if required, outputs the signal 1J such that a value stored in the control signal register 17 is updated. Thereafter, the internal command execution section 14, if required, outputs the address 1G of an internal command to be executed to the program counter 13 such that the internal code 1E to be executed is stored in the internal register 12.

As described above, according to Example 1, the internal ROM selection section 18 selects a ROM region, in which an internal code corresponding to the external command 1B is stored, from a plurality of ROM regions in the internal ROM bank 11, thereby obtaining the control circuit 110.

EXAMPLE 2

Figure 5:
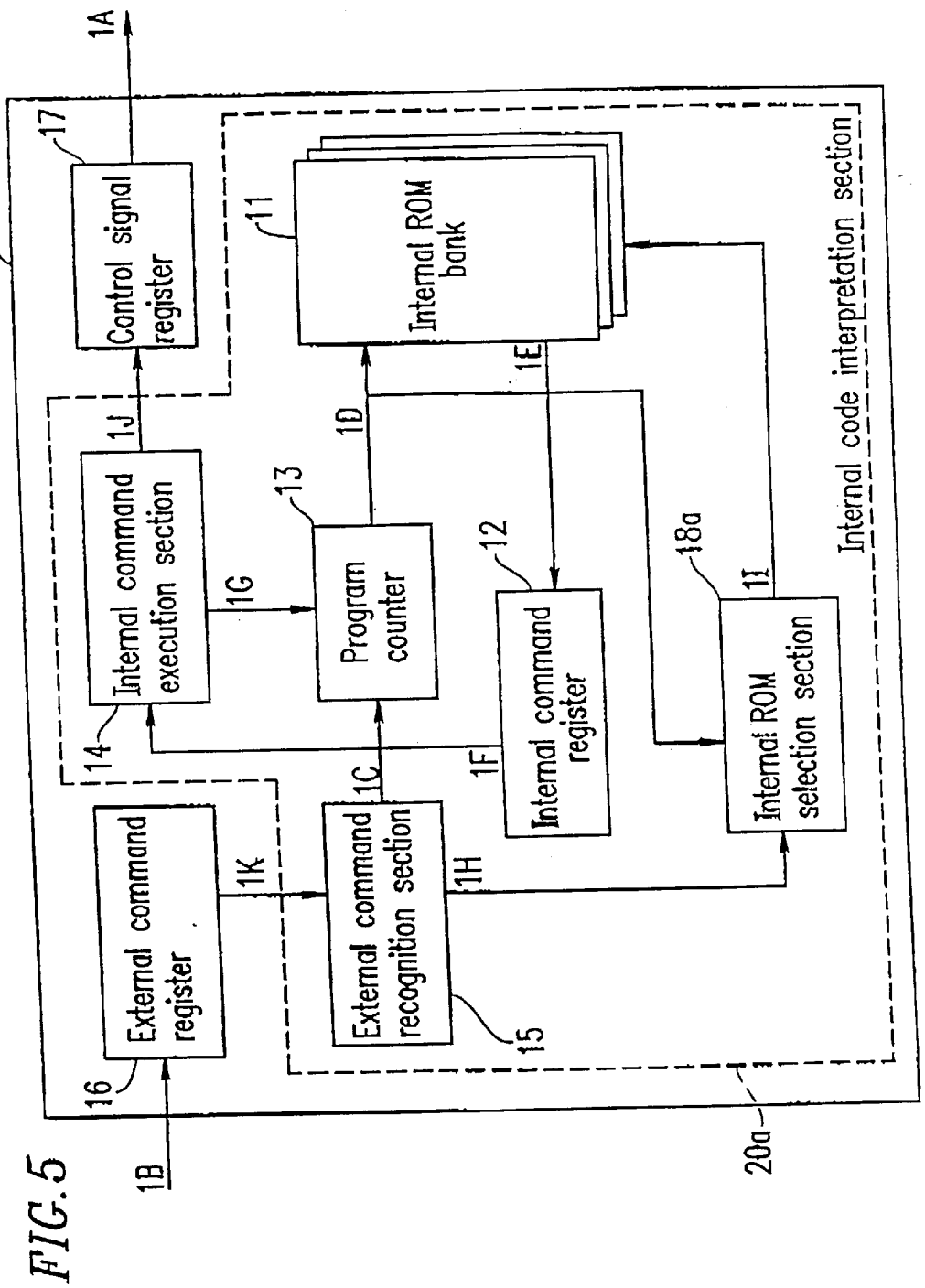
FIG. 5 is a diagram showing a configuration of a control circuit 110a according to Example 2 of the present invention.

FIG. 5 shows a configuration of a control circuit 110a according to Example 2 of the present invention. In FIG. 5, components having the same function as those of Example 1 are indicated by the same reference numerals as those in FIG. 1. An address 1D of an internal command to be executed is input from a program counter 13 to an internal ROM selection section 18a. Similar to Example 1, the internal ROM selection section 18a outputs a signal 1I for selecting a ROM region storing an internal code to be executed from a plurality of ROM regions included in an internal ROM bank 11, in accordance with an external command 1B input to the control circuit 110a. The internal ROM selection section 18a compares the address 1D of the internal command to be executed, indicated by the program counter 13, with a specific address using a comparator circuit or the like. The internal ROM selection section 18a can output the signal 1I for selecting a ROM region storing the internal code to be executed from a plurality of ROM regions included in the internal ROM bank 11 when the address 1D is greater than or equal to a specific address. The comparison of the address 1D with the specific address is not limited to this example. Alternatively, a ROM region may be changed when the address 1D is smaller than or equal to the specific address or when the address 1D is in a specific range.

A typical internal code includes a logical group of a plurality of internal commands (generally referred to as a subroutine). Among the plurality of internal commands, a general-purpose command is included in each internal code.

Figure 6:
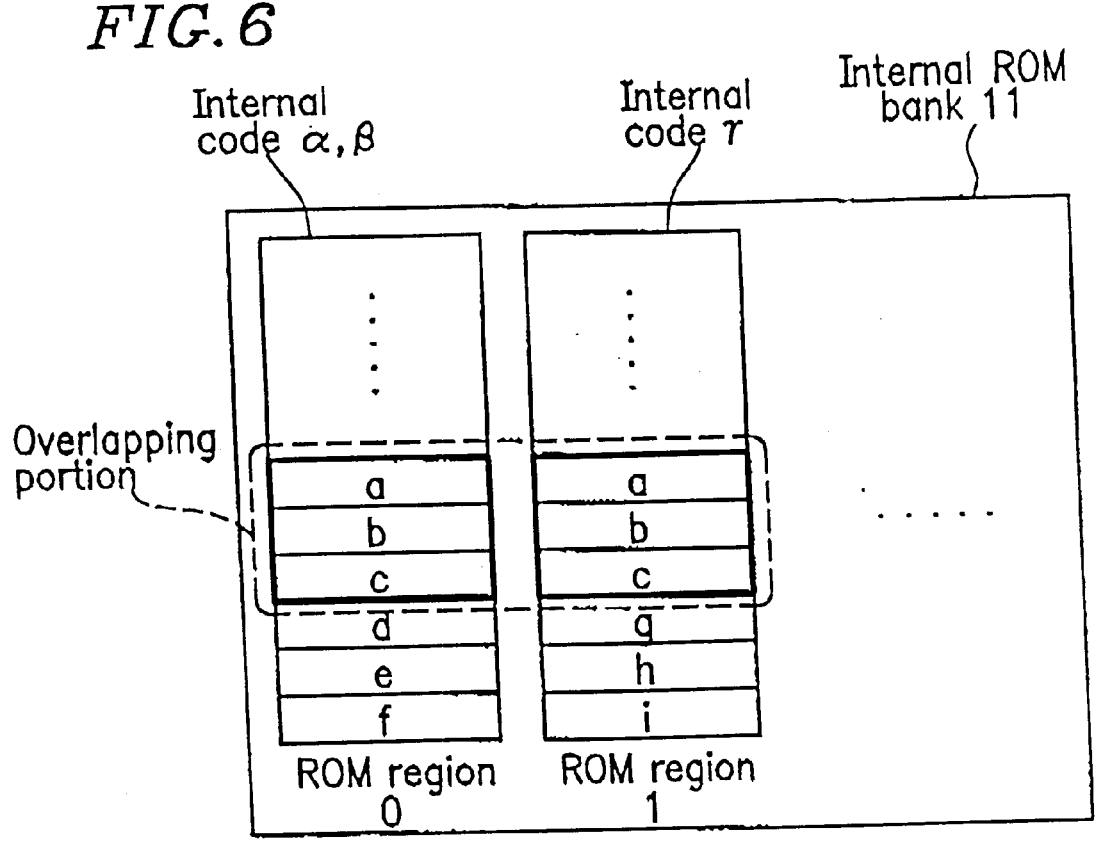
FIG. 6 is a diagram showing a structure of an internal code.

FIG. 6 shows a structure of an internal code in the internal ROM bank 11. Internal ROM region 0, including the internal codes α and β, includes subroutines a, b, c, d, e and f. ROM region 1, including another internal code γ, includes subroutines a, b, c, g, h and i. When the internal codes α and β and the internal code γ are stored in different ROM regions, the subroutines a, b and c overlap between both ROM regions, wasting a certain amount of physical ROM region.

To avoid this, a ROM region located at greater than or equal to a specific address can be shared by another ROM region in the structure of the control circuit 110a of Example 2, resulting in substantially no waste ROM region.

Figure 7:
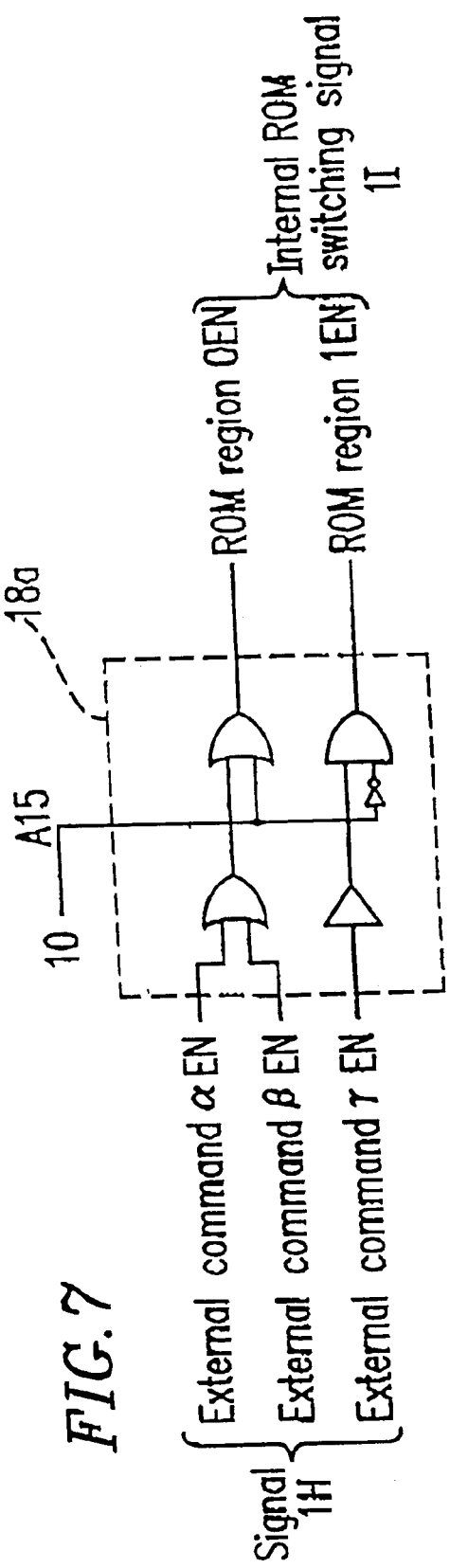
FIG. 7 is a diagram showing a structure of an internal ROM selection section 18a in the control circuit 110a of Example 2.

FIG. 7 shows a structure of the internal ROM selection section 18a in the control circuit 110a of Example 2. When the address of an internal command is 8000H (the specific address), the internal ROM selection section 18a causes A15, which corresponds to a signal at the 16$^{th}$ position from the lower end of the address 1D of an internal command to be executed, to be "H". As shown in FIG. 7, the internal ROM selection section 18a has a structure in which an OR circuit receiving A15 is inserted into the circuit of FIG. 3 for generating the ROM region 0EN signal. With such a structure, the internal ROM selection section 18a can output an internal ROM switching signal 1I which is the ROM region 0EN signal being "H". Therefore, even when the address 1D is 8000H or more, ROM region 0 can be selected, not depending on a ROM region selected when the address 1D is 7FFFH or less.

Figure 8:
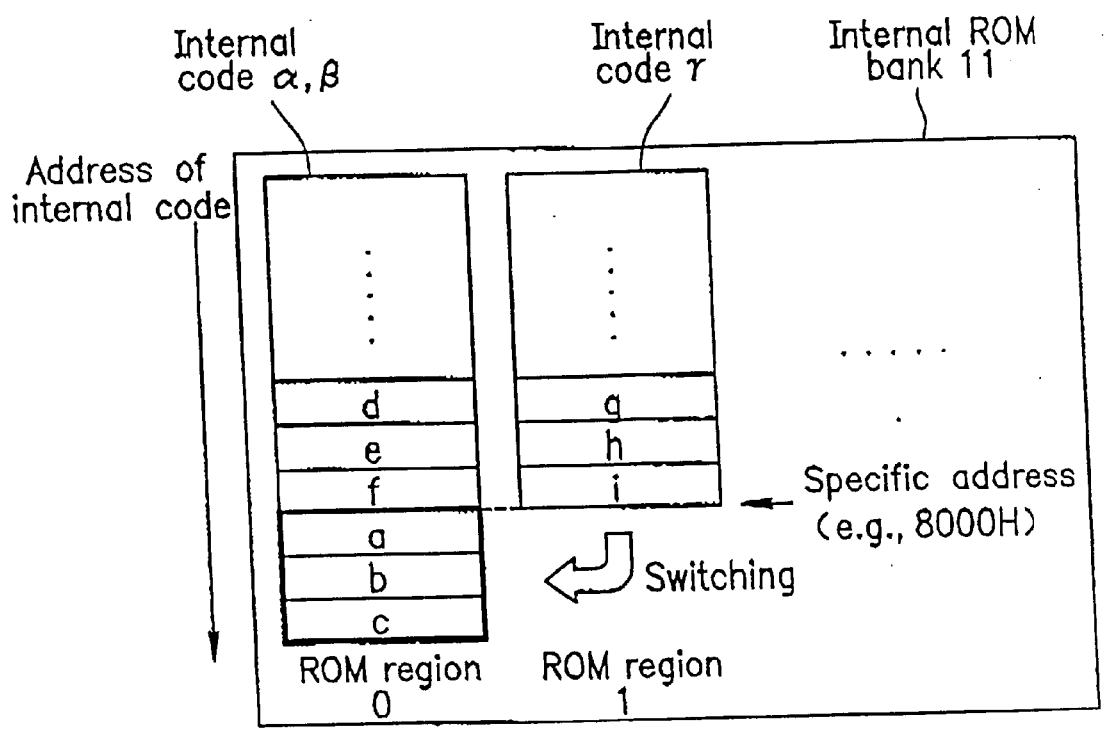
FIG. 8 is a diagram showing a structure of an internal code having a structure obtained by modifying the structure of the internal code of FIG. 6.

In this case, the overlapping subroutines a, b and c shown in FIG. 6 may be provided at the address 8000H or thereafter as shown in FIG. 8, for example.

FIG. 8 shows a structure of an internal code having a structure obtained by modifying the structure of the internal code of FIG. 6. By specifying an address to be compared, the comparator circuit can be substantially omitted or simplified as shown in FIG. 7.

Further, the specified address to be compared with the address of the above-described internal command is not necessarily fixed.

Figure 9:
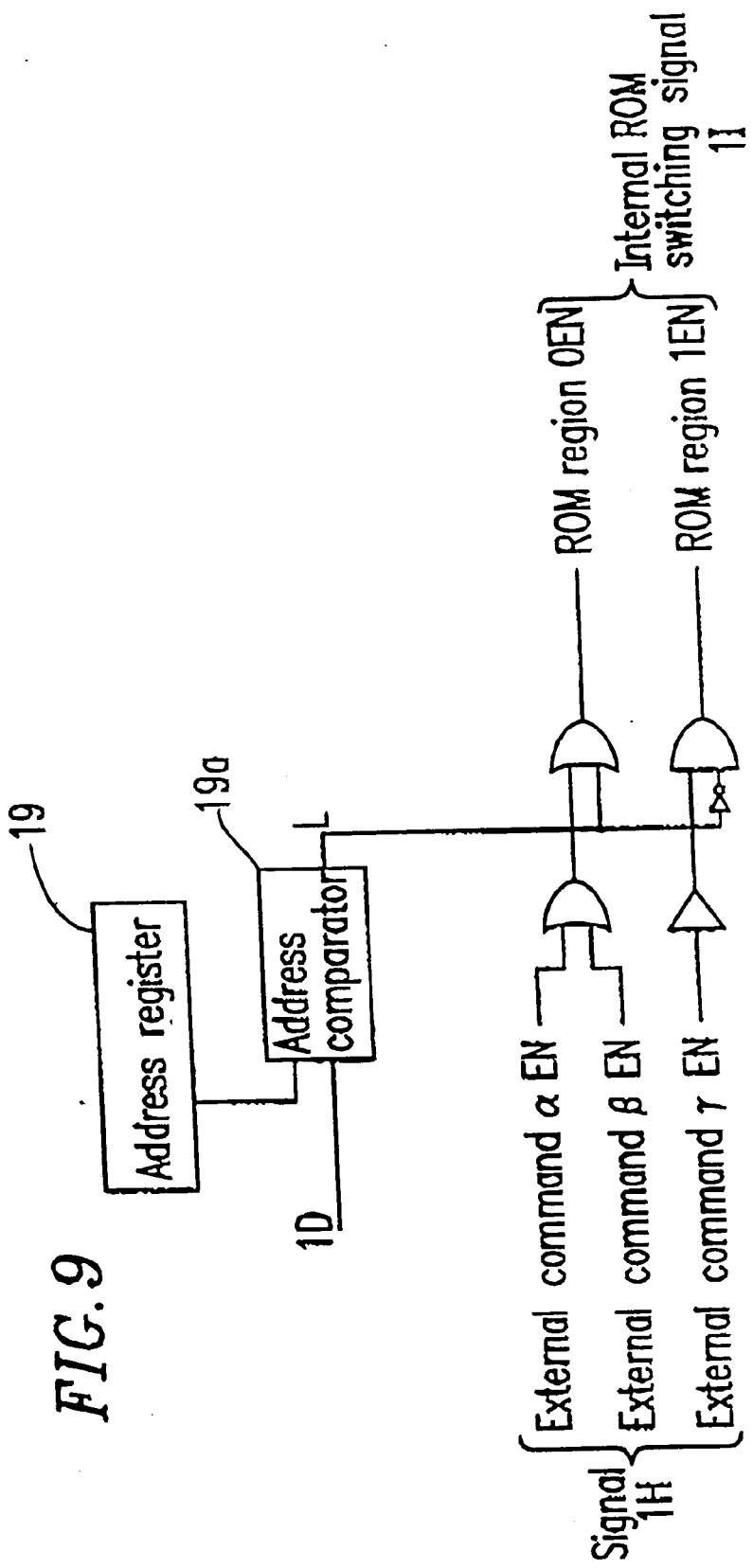
FIG. 9 is a diagram showing another structure of the internal ROM selection section 18a in the control circuit 110a of Example 2.

FIG. 9 shows another structure of the internal ROM selection section 18a of the control circuit 110a of Example 2. The internal ROM selection section 18a is provided with an address comparator section 19a including an address register 19 and a known comparator circuit so that the address comparator section 19a can compare in address stored in the address register 19 with the address 1D of an internal command to be executed. Therefore, when the address 1D is greater, an output signal L of the address comparator section 19a is "H" so that ROM region 0 is selected.

Note that the result of the comparison of an address stored in the address register 19 with the address 1D of an internal command is not limited to the above-described example. When the address 1D is smaller or when the address 1D is in a specific range, a selected ROM region is switched.

EXAMPLE 3

Figure 10:
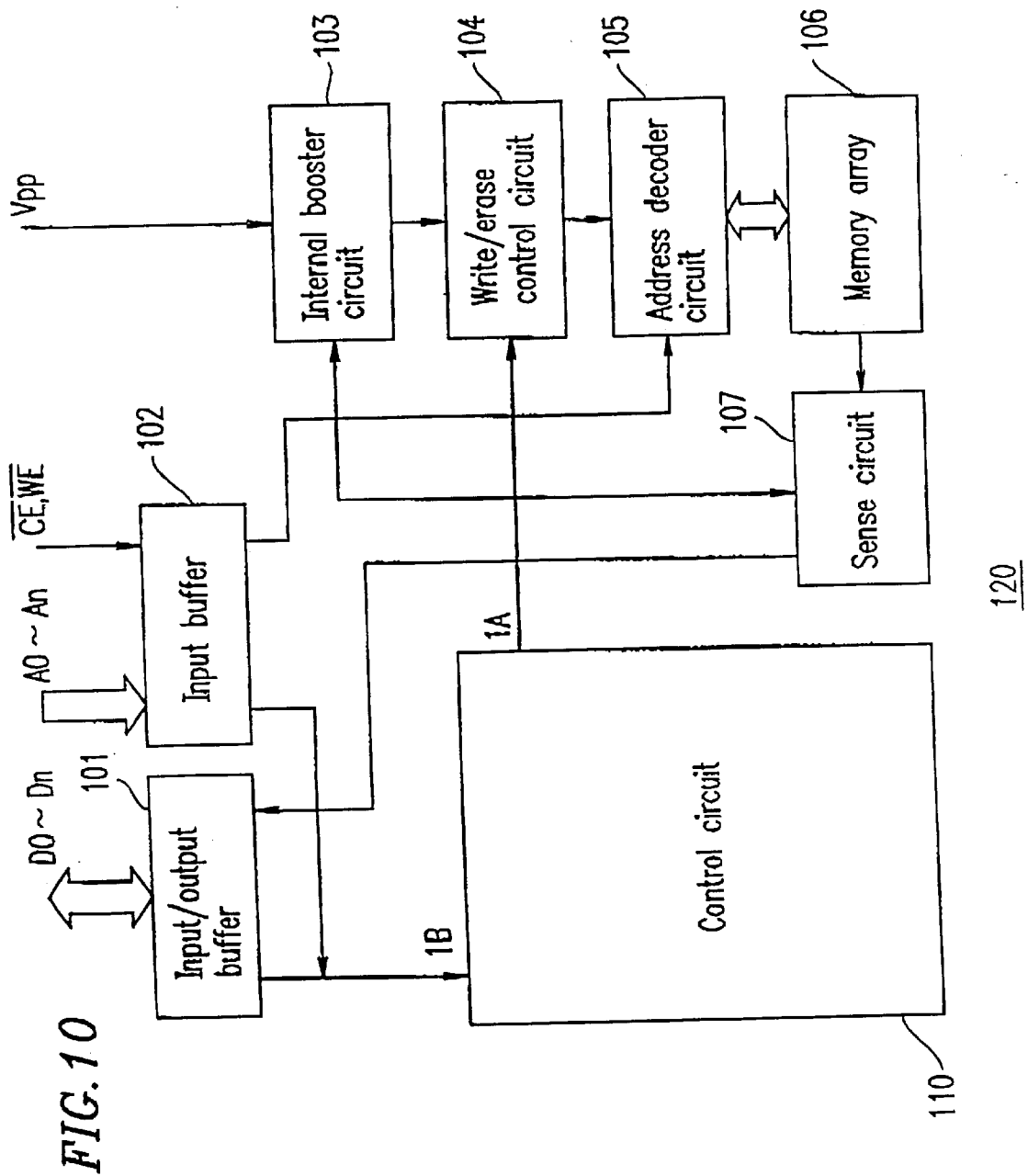
FIG. 10 is a diagram showing a semiconductor memory 120 including the control circuit 110 of Example 1.
Figure 11:
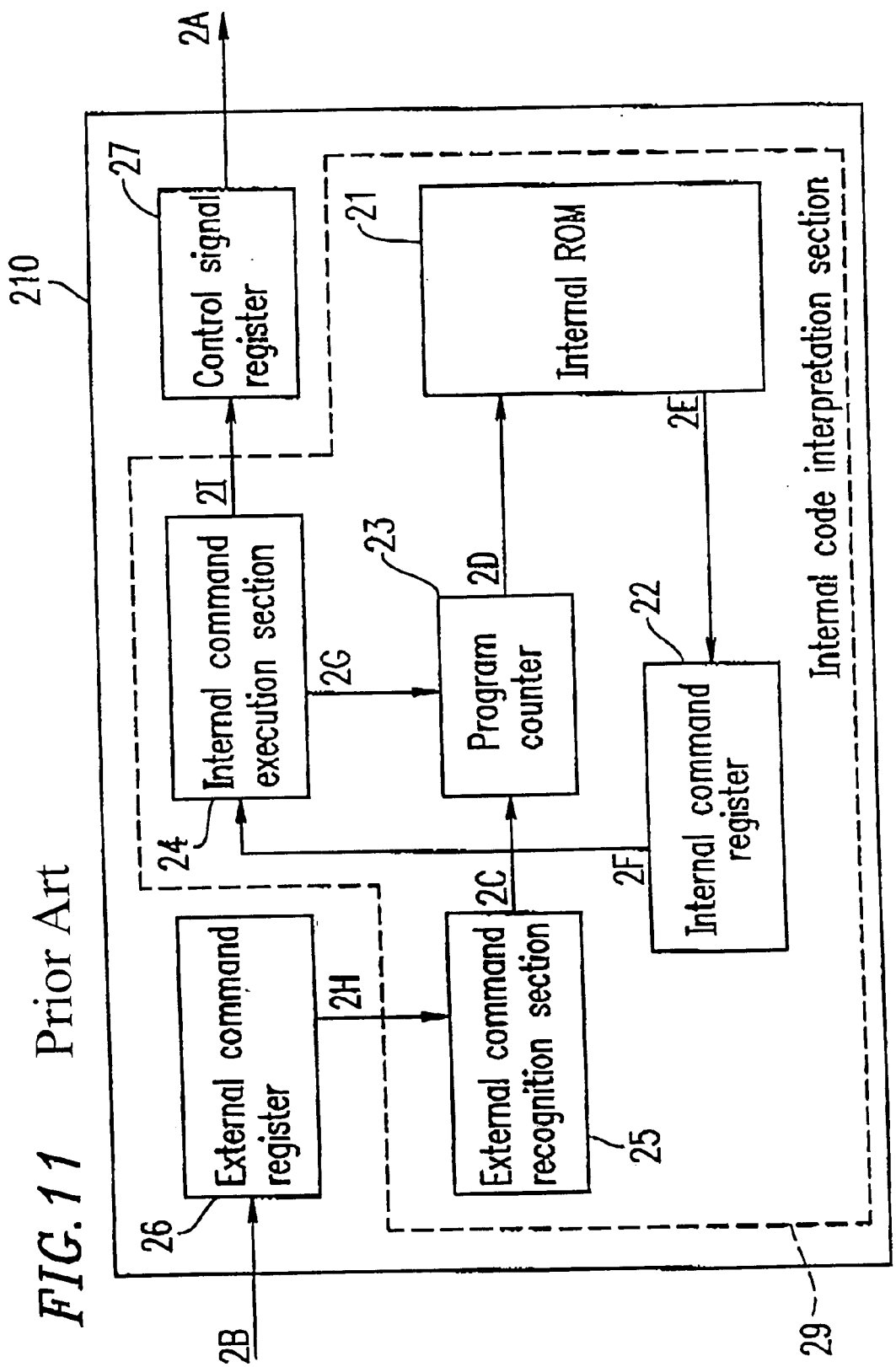
FIG. 11 is a diagram showing a structure of a conventional control circuit 210.
Figure 12:
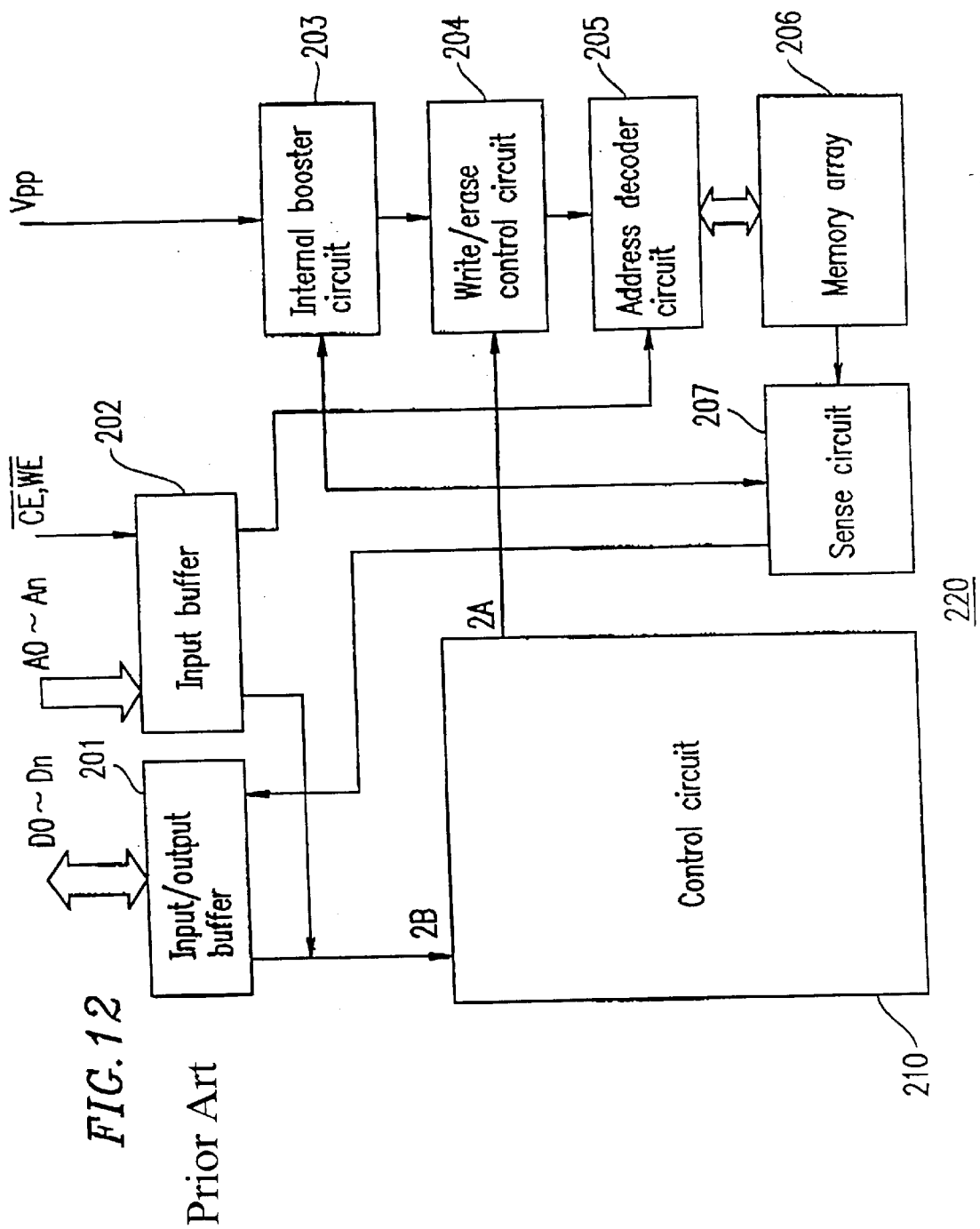
FIG. 12 is a diagram showing a semiconductor memory 220 including the conventional control circuit 210.

FIG. 10 is a diagram showing a semiconductor memory 120 including the control circuit 110 of Example 1. The semiconductor memory 120 includes an input/output buffer 101, an input buffer 102, an internal booster circuit 103, a write/erase control circuit 104, an address decoder circuit 105, a memory array 106, a sense circuit 107, and a control circuit 110. The input/output buffer 101 has data buses D0 through Dn at the input and output sides. The data buses D0 through Dn are used to input external commands, write data, and the like, and to output read data. The input buffer 102 has address buses A0 through An at the input side. The input buffer 102 receives a chip selection signal CE# (# represents an inverted signal) and a command write enable signal WE#. the internal booster circuit 103 boosts a supply voltage Vpp. The memory array 106 is used to store information. The sense circuit 107 reads out information from the memory array 106.

In the semiconductor memory 120, the circuits 103, 104 and 107 are controlled in accordance with the control signal 1A output from the control circuit 110 so that information is written to or erased from the memory array 106. The control signal 1A is input to the internal booster circuit 103, the write/erase control circuit 104 and the sense circuit 107. For example, the internal booster circuit 103 is controlled so that the start or end of a boost is controlled in accordance with the control signal 1A, or the boosted potential of the supply voltage Vpp is determined.

As described above, according to the present invention, a ROM region in which an internal code required for achievement of an operation specified by an external command is stored, can be selected from an internal ROM bank. Therefore, the capacity of an internal ROM can be increased without a considerable level of modification of the control circuit and an increase in the area of a chip, and the development time of an application device can be reduced by utilizing existing design resources.

Further, according to the present invention, a comparator circuit or the like is provided in an internal ROM selection section so that the address of an internal command to be executed indicated by a program counter is compared with a specific address. In accordance with a result of the comparison, a ROM region is selected so that an internal command can be shared by a plurality of internal codes. Therefore, the ROM region is physically reduced, thereby reducing the area of a control circuit.

Furthermore, according to the present invention, an address register is provided in an internal ROM selection section so that the address register is set to an arbitrary value. The address of an internal command to be executed is compared with the value of the address register. In accordance with a result of the comparison, a ROM region is selected so that the internal command shared by a plurality of internal codes can be provided in an arbitrary ROM region.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A control circuit, comprising:
    an external command recognition section for recognizing an external command, the external command being an operation command input from outside the control circuit;
    an internal ROM bank including a plurality of storage regions, the internal ROM bank being used to store an internal code for achieving operations specified by the external command recognized by the external command recognition section;
    an internal ROM selection section for selecting a required storage region from the plurality of storage regions of the internal ROM bank in accordance with the external command recognized by the external command recognition section;
    a program counter for selecting and indicating an address of an internal command to be executed from a plurality of addresses of internal command stored in the internal ROM bank;
    an internal command register for storing the internal command read from the internal ROM bank; and
    an internal command execution section for executing the internal command stored in the internal command register.

2. A control circuit according to claim 1, wherein the internal ROM selection section can switch the selected storage region depending on a result of a comparison of the address indicated by the program counter with a specific address.

3. A control circuit according to claim 2, wherein the internal ROM selection section further includes an address register, and the specific address can be changed by setting an arbitrary value in the address register.

4. A semiconductor device comprising a control circuit, the control circuit comprising:
    an external command recognition section for recognizing an external command, the external command being an operation command input from outside the control circuit;
    an internal ROM bank including a plurality of storage regions, the internal ROM bank being used to store an internal code for achieving operations specified by the external command recognized by the external command recognition section;
    an internal ROM selection section for selecting a required storage region from the plurality of storage regions of the internal ROM bank in accordance with the external command recognized by the external command recognition section;
    a program counter for selecting and indicating an address of an internal command to be executed from a plurality of addresses of internal commands stored in the internal ROM bank;
    an internal command register for storing the internal command read from the internal ROM bank; and
    an internal command execution section for executing the internal command stored in the internal command register.

5. A semiconductor device according to claim 4, wherein the internal ROM selection section can switch the selected storage region depending on a result of a comparison of the address indicated by the program counter with a specific address.

6. A semiconductor device according to claim 5, wherein the internal ROM selection section further includes an address register, and the specific address can be changed by setting an arbitrary value in the address register.

* * * * *

UNITED STATES PATENT AND TRADEMARK OFFICE
CERTIFICATE OF CORRECTION

PATENT NO. : 6,442,058 B2  
DATED : August 27, 2002  
INVENTOR(S) : Yasumichi Mori It is certified that error appears in the above-identified patent and that said Letters Patent is hereby corrected as shown below:

Column 3,  
Line 65, please replace "execution" with -- executing --;

Column 4,  
Line 13, please replace "$2^{13}$" with -- $2^{15}$ --;

Column 8,  
Line 7, please replace "11" with -- 110 --;

Column 9,  
Line 7, please replace "codes" with -- code --;

Column 10,  
Line 27, please replace "16$^{th}$" with -- 16$^{th}$ bit --.

Signed and Sealed this

Tenth Day of June, 2003

JAMES E. ROGAN  
*Director of the United States Patent and Trademark Office*